J. KROHN.
DIFFERENTIAL GEARING.
APPLICATION FILED NOV. 15, 1917.
1,413,855.
Patented Apr. 25, 1922.
7 SHEETS—SHEET 4.
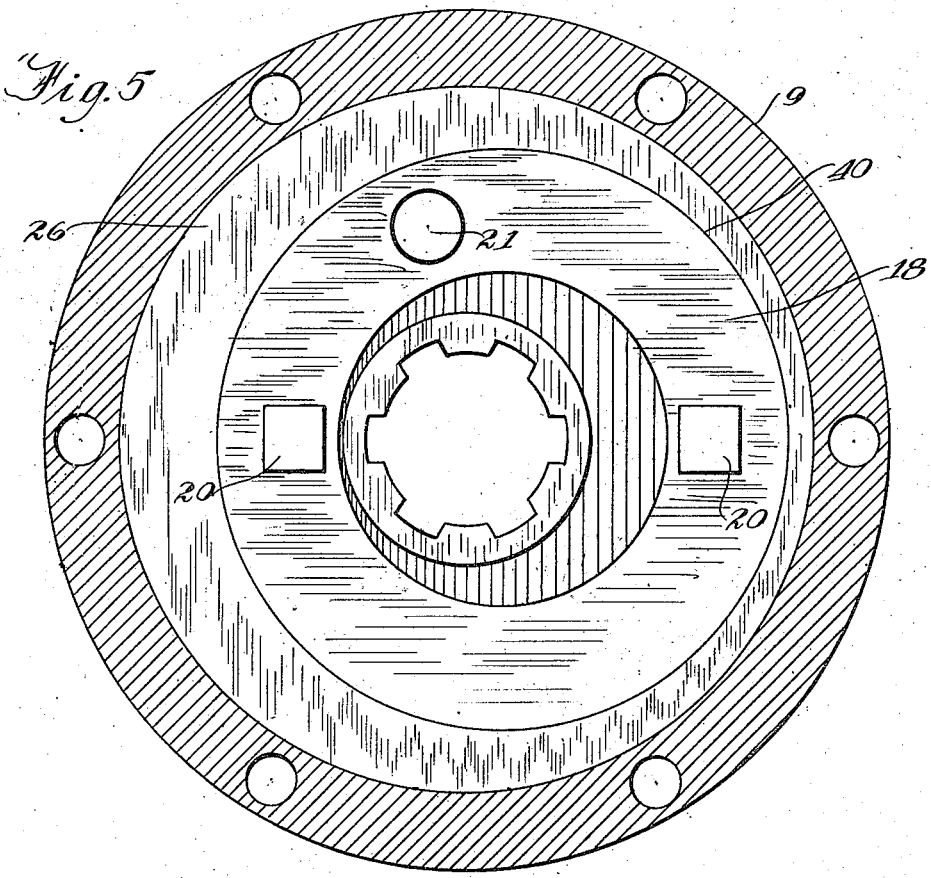
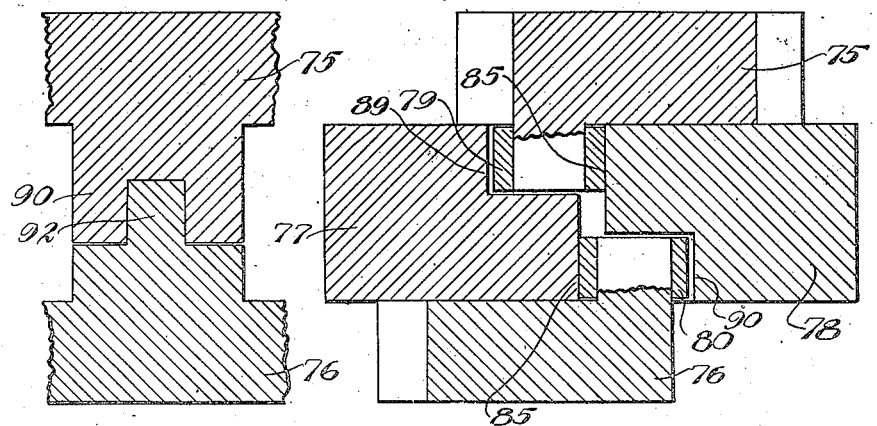

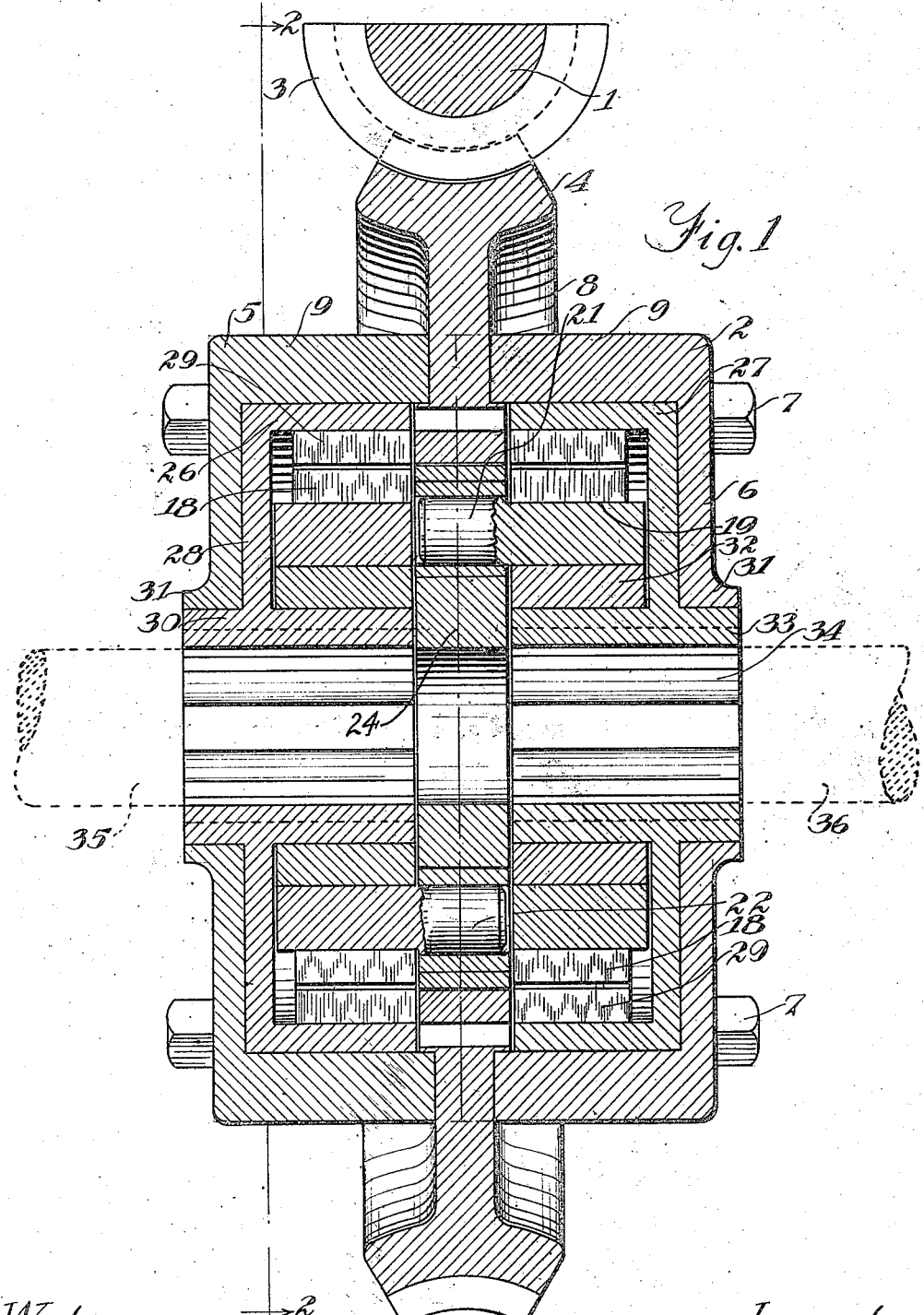

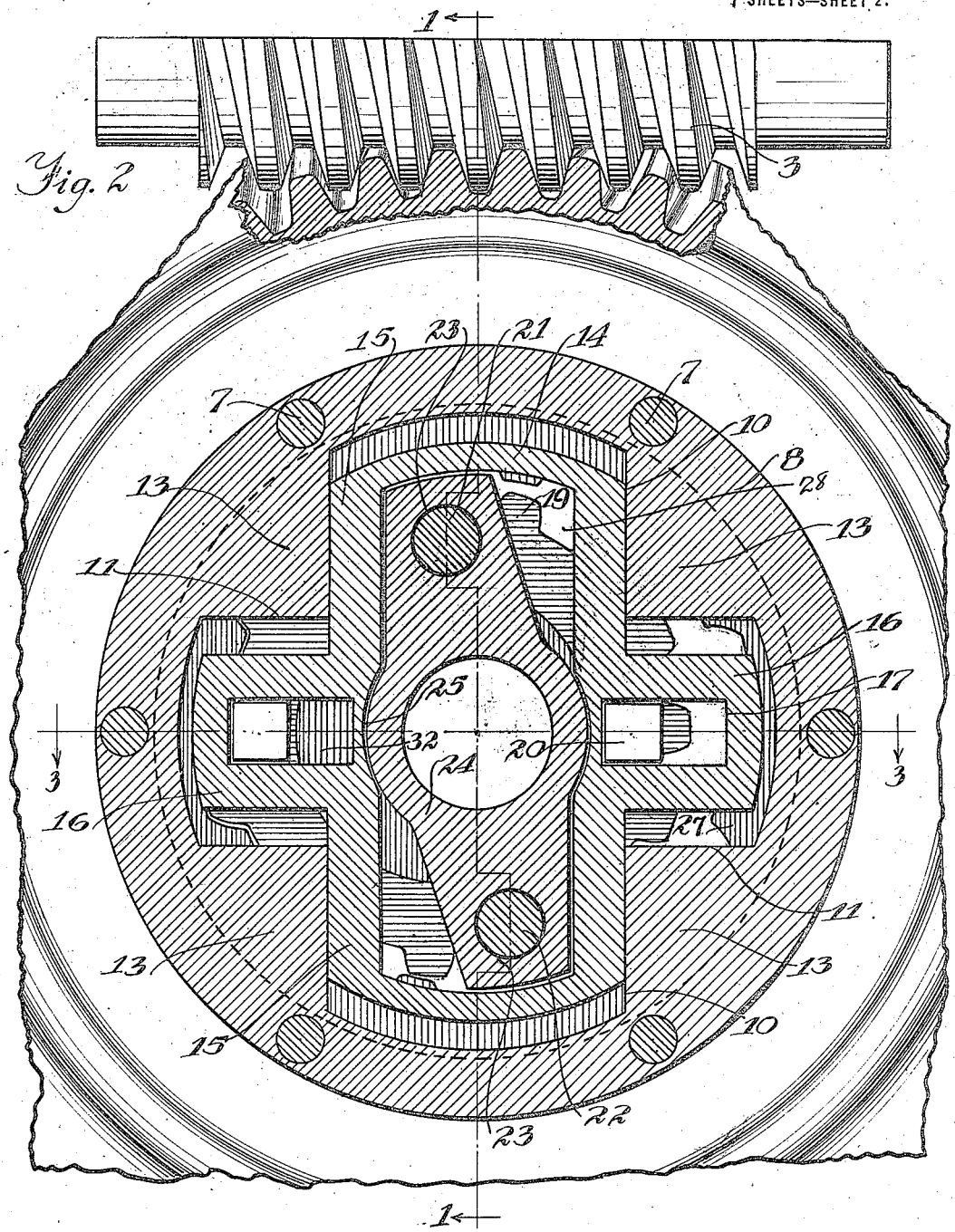

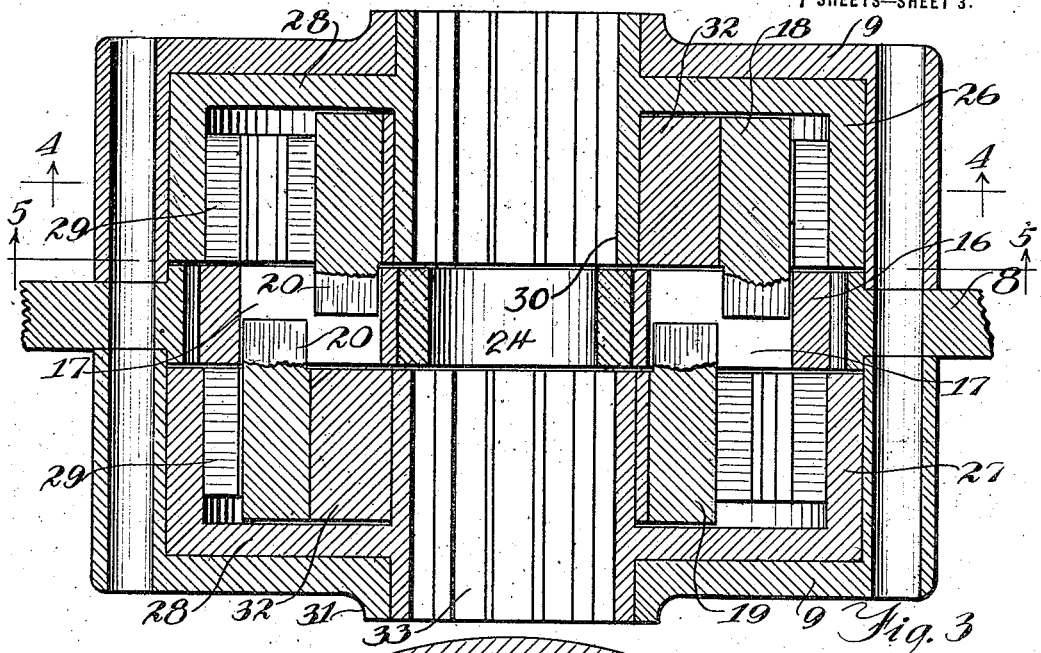
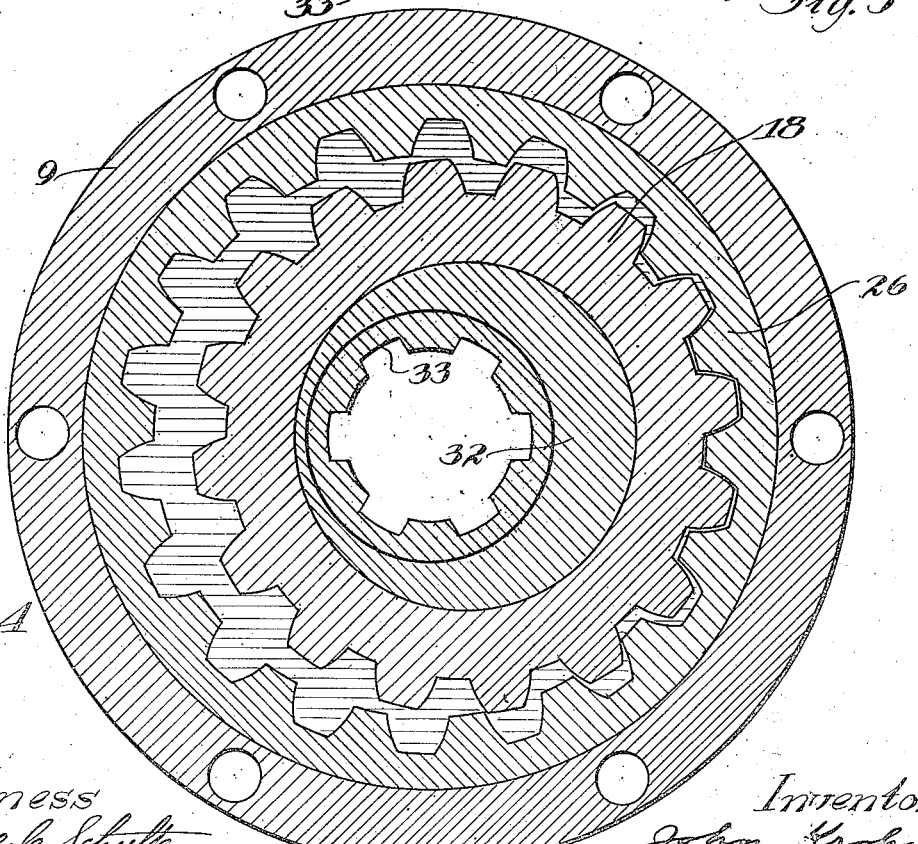

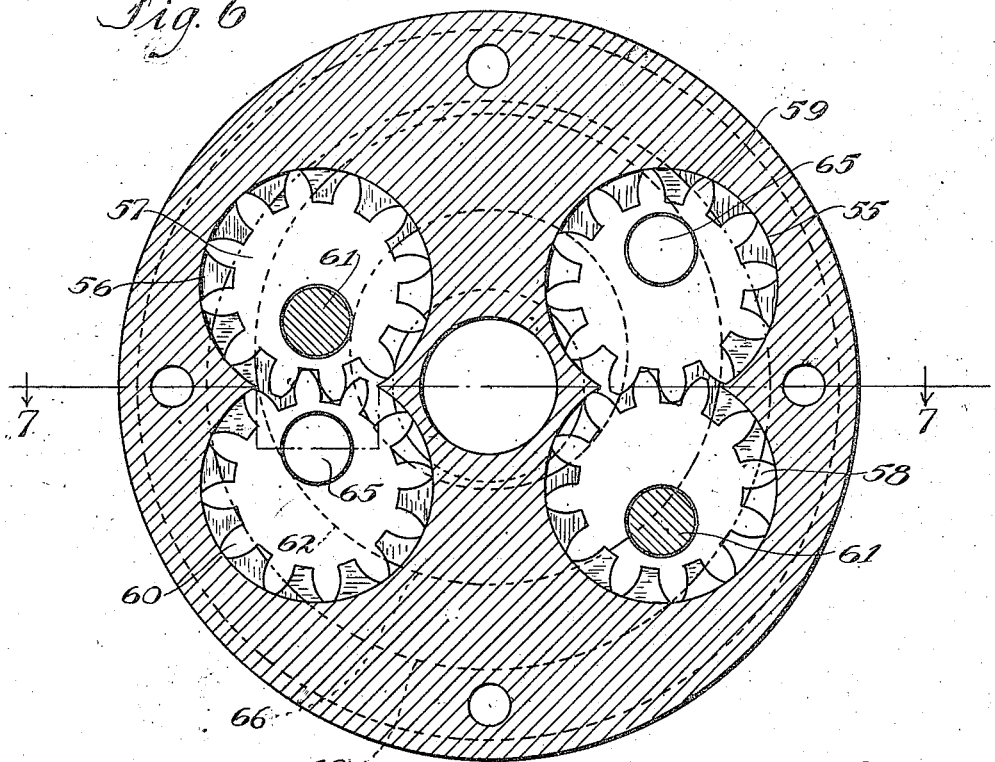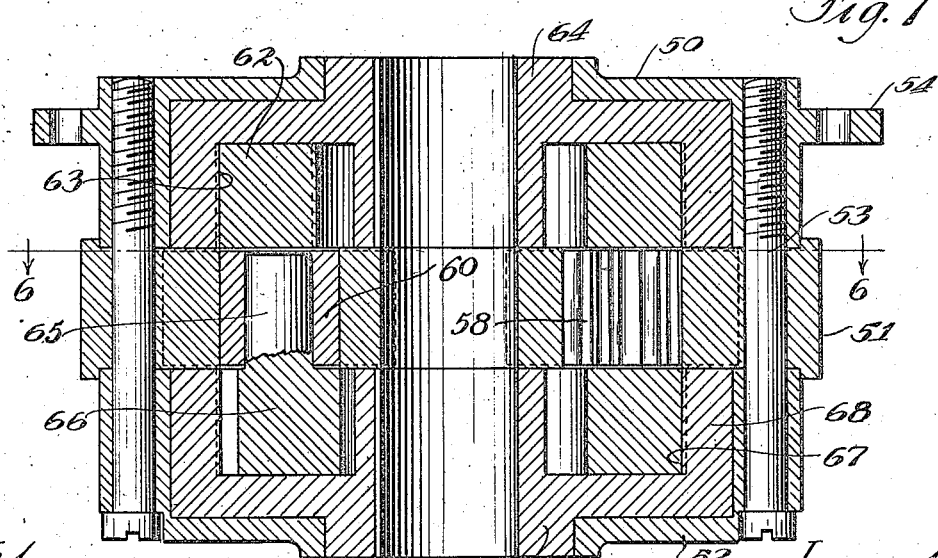

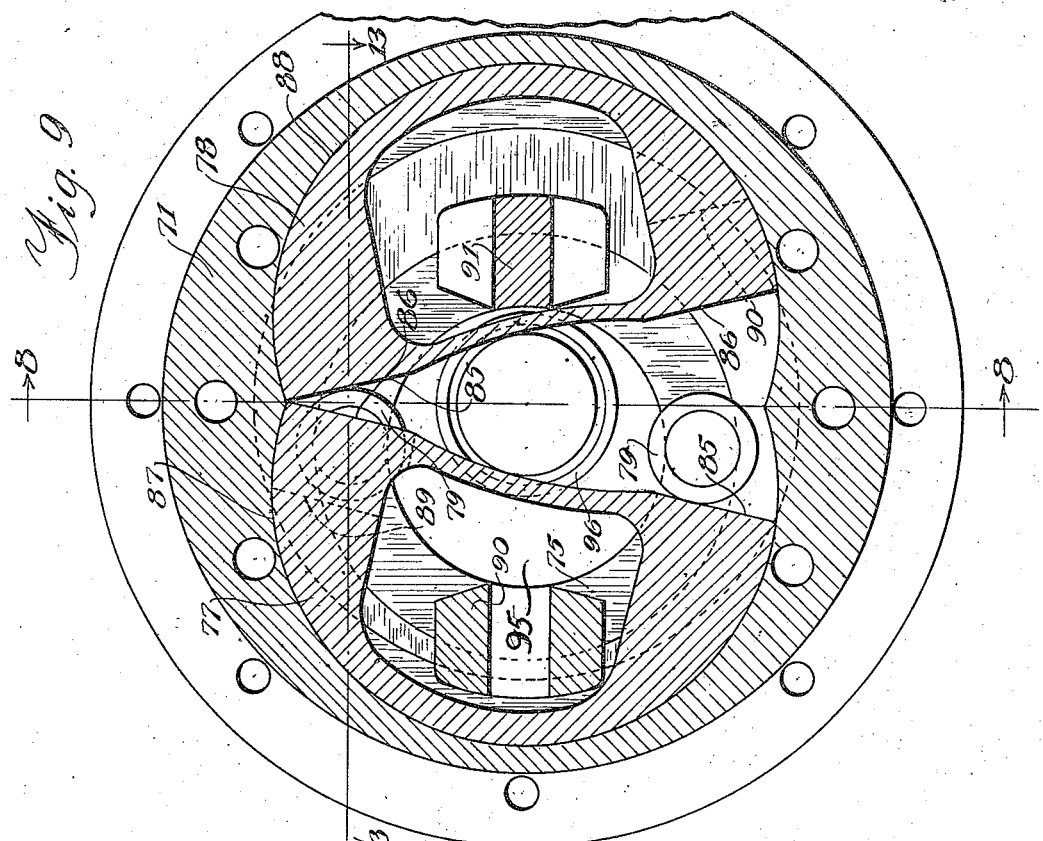
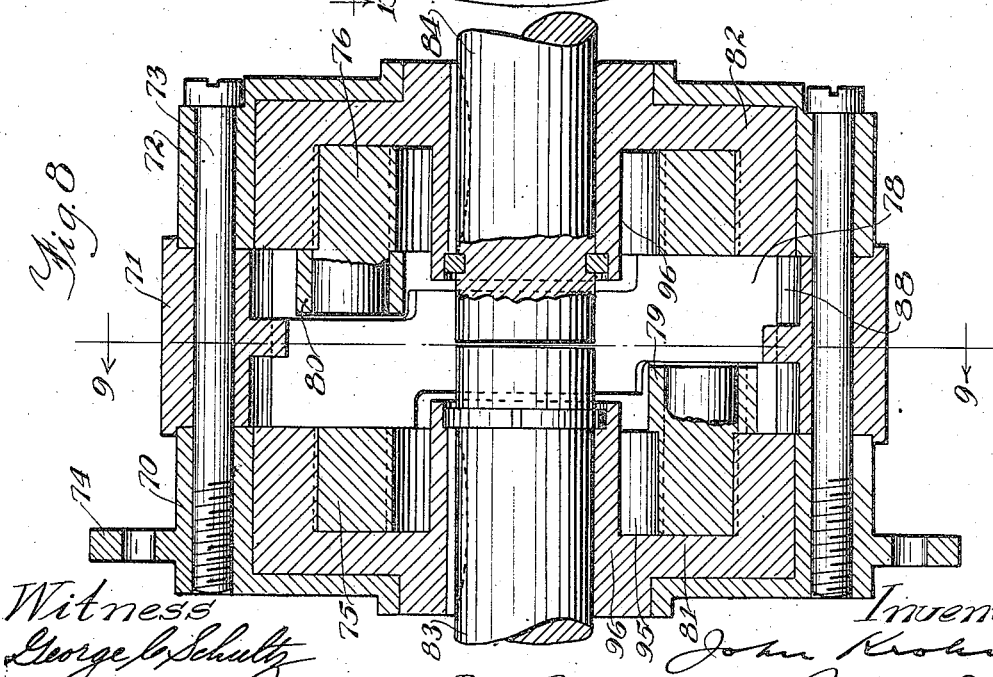

J. KROHN.
DIFFERENTIAL GEARING.
APPLICATION FILED NOV. 15, 1917.

1,413,855.

Patented Apr. 25, 1922.
7 SHEETS—SHEET 7.

Witness
George C. Schultz

Inventor
John Krohn
By Ammuler & Ammuler
Attys

UNITED STATES PATENT OFFICE.

JOHN KROHN, OF CHICAGO, ILLINOIS.

DIFFERENTIAL GEARING.

1,413,855.  Specification of Letters Patent.  Patented Apr. 25, 1922.

Application filed November 15, 1917. Serial No. 202,126.

*To all whom it may concern:*

Be it known that I, JOHN KROHN, a citizen of the United States of America, and a resident of Chicago, county of Cook, and State of Illinois, have invented certain new and useful Improvements in Differential Gearings, of which the following is a specification.

This invention relates to differential gears for vehicles wherein the driven wheels are permitted to rotate at slightly different speeds in accordance with the differences in the tire circumferences, or the inequalities of the road surfaces, or the differences in the radii of the curves in which the wheels are rolling when the vehicles turn. A further aim of the design is to provide for maintaining the required tractive action of the driven wheel or wheels which frictionally adhere or remain in contact with the road when one or more of the group of wheels of a vehicle has lost contact with the road surface, or fails to properly grip the same, due to the slippery condition of the road.

The invention consists of an adaptation of the gearing which is known as eccentric gearing, to new purposes, namely, to provide for the differential action required between driven shafts of power vehicles. The invention further consists in a new design of eccentric gearing involving a novel mode of operation.

The objects of the invention are to provide an improved differential gearing which will meet all the before-mentioned requirements for vehicle drives, while necessitating but few and substantial elements in its structure.

An illustrative embodiment of the invention is shown in the accompanying drawings, in which—

Fig. 1 shows in transverse vertical section a differential gearing constructed according to this invention.

Fig. 2 is a side elevation of the gearing, partly in section, along the line 2—2 of Fig. 1.

Fig. 3 is a horizontal sectional view along the line 3—3 of Fig. 2.

Fig. 4 is a vertical sectional detail taken on the line 4—4 of Fig. 3.

Fig. 5 is a detail with the casing shown in section, of a modified form of the eccentric members of the differential mechanism.

Fig. 6 is a transverse sectional view illustrating another modification of the invention.

Fig. 7 is a longitudinal sectional view of the mechanism shown in Fig. 6.

Fig. 8 is a longitudinal sectional view of another modified form of the invention.

Fig. 9 is a transverse sectional view taken on the line 9—9 of Fig. 8.

Fig. 12 is a sectional detail taken on the line 12—12 of Fig. 10.

Fig. 13 is a sectional detail taken on the line 13—13 of Fig. 9.

Figure 10:
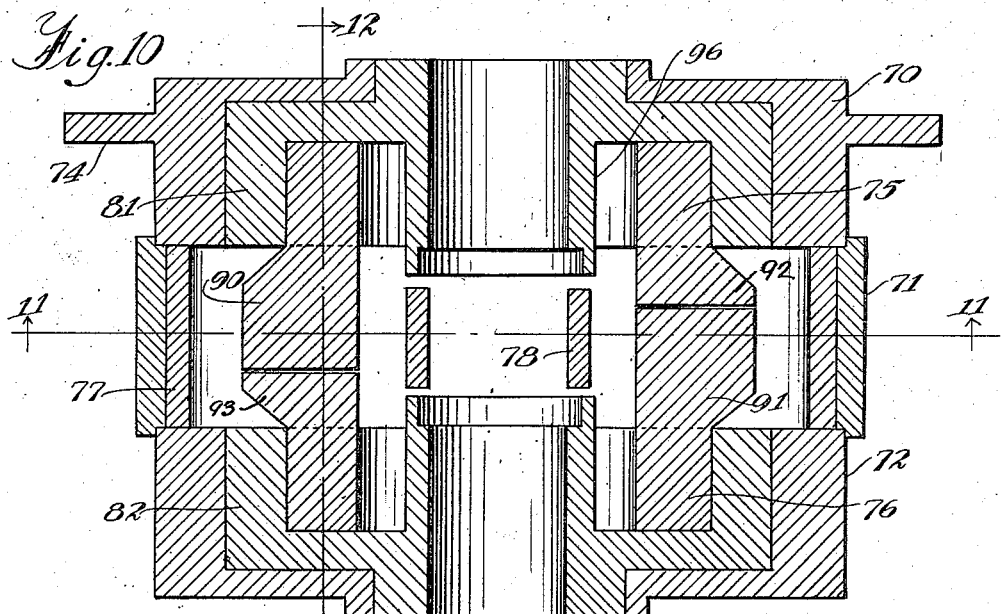
Fig. 10 is a longitudinal sectional view taken at right-angles to the section shown in Fig. 8.

Only a limited differential action is required between the driven wheels of a vehicle, since the transverse distance between wheels is comparatively slight, and therefore the radii of the circles described by the wheels in making a turn differ only in the matter of a few feet. The maximum increase in speed required of the outer wheel over the inner one in the ordinary turning of a vehicle is approximately a ratio of 10 to 9, or less. In fact, with a vehicle having a gage of 56 inches between wheels, and wheels 30 inches in diameter, the outside wheel will turn three and two-thirds times more than the inside wheel, for every complete turn or circular track described by the vehicle. The present invention is designed to meet these requirements, but to make difficult needless differential action between the wheels.

The present-day requirements for vehicle differential gearings are believed to be clearly set forth in an article by B. D. Ormsby, "Differential substitutes", in the bulletin of the Society of Automobile Engineers for May, 1916. Reference is made to this article since it fairly describes the state of the art at the present time and mentions a number of the most important devices so far provided having the same end in view as the present invention.

The drawings show a worm shaft 1 for transmitting the power from the motor to the housing 2 of the differential gearing. The shaft 1 carries a worm 3 meshing with a worm wheel 4, fixed to the housing 2, preferably by being clamped by bolts 7 between the two parts 5 and 6 of the housing. The annular web portion 8 of the wheel 4 extends inwardly between the flanges 9 of the sections 5 and 6 of the housing, and is provided with two pairs of rectangular recesses 10 and 11, thus leaving the four angular shoulders 13 between the recesses. A cross-shaped power transmitting member 14 is mounted within the recesses 10 and 11, the arms 15 and 16 of the member 14 being so proportioned as to allow for the movement of the cross 14 with respect to the worm wheel radially along the recesses 10. The arms 16 of the cross 14 are each provided with an opening or slot 17. A pair of external gears 18 and 19, one of which is located at each side of the cross 14, have square lugs 20 extending into the openings 17 in the cross as shown in Fig. 3. With this construction, the cross may reciprocate along the cut-out portions 10 in the web of the worm wheel 4, thus in this movement carrying the gears 18 and 19 with it, since the lugs of the gears extend through the slot 17; while the gears may move relatively to the cross 14 transversely to the direction of movement of the cross, the square lugs 20 then moving lengthwise along the slot 17. Each of the gears 18 and 19 is also provided with a single cylindrical lug or pin numbered in the drawings 21 with respect to the gear 18, and 22 with respect to the gear 19. These cylindrical lugs extend into drilled openings 23 at the ends of a lever 24 which is journaled within the circular surface 25 on the interior of the cross. The arms 14 are internally cut away to receive the lever 24 and permit its oscillation in the journal 25. The gears 18 and 19 respectively mesh with internal gears 26 and 27 which are rotatably mounted within the sections 5 and 6 of the housing 2. The internal gears have webs 28 at their outer faces clear of the teeth 29 of these gears and connecting their rims with their hubs 30. The hubs on the outer side of the webs 28 provide journals for the housing by extending within the portions 31 of the sections 5 and 6 of the housing. The inner portions of the hubs 30 support eccentrics 32 upon which the external gears 18 and 19 are journaled. The eccentrics are free to rotate around the hubs 30 and within the external gears 18 and 19. Assuming that the difference in pitch diameter between the external gears and the internal gears is one-half inch, the centers of the eccentrics are one-fourth inch to one side of the center of the unit. The entire throw of the cross 14 along the slots 10 is one-half inch, and a motion of one-half inch is allowed for the lugs 20 along the slots 17.

Assuming that the gear 4 is stationary and the internal gears are oppositely rotated, this construction would permit the gears 18 and 19 to be driven by the internal gears in a circular path without turning on their axes, but due to the connection provided by the lever 24, such motion of the gears 18 and 19 is necessarily in opposite directions, and for the same reason, the two internal gears cannot both simultaneously rotate in the same direction with respect to the gear housing or cross construction described. The hubs 30 of the internal gears on their inner surfaces have key-ways 33 for receiving the splined ends 34 of the driven wheel shafts 35 and 36.

In the normal operation of the device, the structure, like most differential gears, rotates as a unit, no relative motion occurring between the elements within the housing 2. Differential action takes place with ease when one shaft is accelerated and the other is retarded, or forces are applied to the shafts in opposed directions, but in many arrangements of the present differential mechanism, differential action cannot ordinarily be effected by a force applied to one shaft only. This is due to the eccentricity of the external gears, or rather, the ratio between the internal and external gears, plus the rapid circular motion which the external gears are compelled to execute and communicate to each other at the times of differential action. In the example shown, there are eighteen teeth on the internal gears and sixteen teeth on the external gears. Accordingly, considering alone the gearing shown in Fig. 4, if the gear 18 is given its eccentric motion without being permitted to turn on its axis, for every circular bodily revolution of the gear 18, it will drive the internal gear the distance of two teeth, or one-ninth of its circumference. Again, by turning the gear 26, for every two teeth it moves, it will compel the gear 18 to execute a complete circular motion without rotating on its axis, due to the housing being held stationary. These are the actions which take place at the times of differential motion, while the housing 2 is rotating. The bodily eccentric motion of the gear 18, occurring at the same time that the gear is rotated, drives the gear 26, due to its connection with the cross 14 which is rotated with the housing and worm wheel 4.

For example, assuming that the entire structure is rotating and driving the shafts 35 and 36, and the shaft 36 is retarded as it would be if the wheel which it carries were the inside wheel while turning; to the extent which the shaft 36 is retarded, the internal gear 27 (Fig. 1) will decrease in speed with respect to the housing 2, thus in effect rotating backwardly with respect to the housing within which it is journaled. This action results in the external gear 19 moving in an eccentric path with relation to the internal gear 27, and, since the external gear is compelled by its lug engagement with the cross to rotate with the cross and the housing, the extent which it actually drives the gear 27 is the difference between the effects of its rotary and eccentric motions. In order to permit this difference in speeds of the internal and external gears, the gear 19 is compelled, in addition to its rotation under the action of the cross, to move through an eccentric circle as it rolls backward on the retarded gear 27. The rolling motion of the gear 19 is permitted by the cross construction. For every circular motion of the gear 19 eccentrically with respect to the remainder of the unit, the companion gear 18 is compelled to execute a circular motion in the opposite direction, due to the lever connection 24 as shown in Fig. 2. Since this eccentric motion of the gear 18 is in the same direction as the rotation of the housing and worm wheel 4, the speed of the shaft 35 will be increased over that of the housing and worm wheel 4. Thus, if the housing is driven, say nine revolutions per minute and the shaft 36 is retarded so as to only execute eight revolutions per minute, the shaft 36 will execute ten revolutions.

At the times of differential action, the circular motion of the gears 18 and 19 is provided for by permitting the cross 14 to reciprocate in the recesses 10 in the flange of the gear 4, the cross 14, lever 24, and external gears moving as a unit in this sense, while the external gears are permitted to reciprocate with respect to the cross in a transverse direction as guided by the slots 17, the lever 24 oscillating. The eccentrics 32, being loosely journaled on the hubs 30 and within the external gears, are compelled to accommodate themselves to the relative rotation and eccentric motion between the internal and external gears.

The ratio of the gearing or amount of eccentricity has an effect upon the resistance which the device offers to differential action. If there is less difference between the pitch diameters of the internal and external gears than that shown in the drawings, the eccentricity or leverage will be less and the device will offer greater resistance to differential action. Also, if there is a greater difference in pitch diameters or the number of teeth shown in the drawings, the differential action will take place with more ease.

By means of eccentric gearing, it is possible in a differential mechanism to obtain almost any desired resistance to differential action or ratio, without changing the number of gears or their over all dimensions. Therefore, as an extreme example, there might be one hundred teeth in the internal gears and ninety-nine in the external gears, giving a ratio of one hundred to one, On the other hand, there might be one-half as many teeth in the external gears as there are in the internal gears, with the ratio of two to one, and consequently providing a considerable reduction in resistance offered to differential action. It is possible by omitting the teeth of the gears to produce a one to one ratio.

Fig. 5 shows a modification of the eccentric elements of the invention wherein the members 26 and 27 (27 not shown) which are respectively secured to the driven axles are of the same form as the members 26 and 27 shown in Figs. 1 to 4, except that the gear teeth are omitted and an eccentric circular recess 40 is provided for the reception of a toothless eccentric disk 18 corresponding to the external gears 18 and 19 shown in Figs. 1 and 4. A pair of these eccentric disks are connected together by means of the cross and lever construction previously described, and through the pins 20 and 21 receiving rotation from the cross construction in the same manner as the gears 18 and 19, and at times of differential action being compelled to move in opposite eccentric paths by means of the lever connection with the pins 21.

The operation of this form of the invention is the same as that previously described, except in the matter of ratio. Normally, the entire structure rotates as a unit, but if one of the driven axles is retarded, the corresponding eccentric 18, while still rotating within the recess 40 at the same angular rate at which the cross rotates, has a relative sliding motion with respect to the cross, as its square lugs 20 move along the slots 17 in the cross. This relative sliding motion between the cross and the eccentric 18 causes a corresponding oscillation of the lever 24, and consequently, a reverse eccentric motion of the companion eccentric.

With this modified form, it is clear that the eccentric 18 can travel in its eccentric path only once for each complete relative rotation of the member 26, whereas in the toothed form first described, the gear 18 takes this circular eccentric motion every time the internal gear 26, Fig. 4, rotates relatively of the gear 18 a distance of two teeth.

Modifications.

A modification of the invention is shown in Figs. 6 and 7. This modification includes the toothless eccentrics illustrated by Fig. 5, but instead of being provided with the cross and lever construction for communicating motion to and between the eccentrics, is provided with small intermeshing eccentric pinions for accomplishing the same result. In this form, the housing comprises three parts 50, 51, and 52, which are secured together by bolts 53. Extending from the part 50 is an annular flange 54 to which may be secured a gear for receiving motion from the motor.

The part 51 of the housing is provided with two transverse apertures 55 and 56 at opposite sides and in the form of the figure 8. Fitted within these apertures are two pairs of pinions 57, 58, 59, and 60. The pinions 57 and 58 are eccentrically journaled on stub shafts 61 extending from the side of an eccentric disk 62 journaled within an eccentric circular recess 63 in the member 64 journaled in the part 50 of the housing and secured to one of the driven axles. The pinions 59 and 60 are likewise eccentrically journaled on the stub shafts 65 extending inwardly from the side of an eccentric disk 66 journaled in the eccentric circular recess 67 in a circular member 68 which is secured to one of the driven axles and journaled in the part 52 of the housing.

In the operation of this form of the invention, the power from the housing is transmitted through the member 51 to the pinions 57 to 60 inclusive and through the stub shafts on which these pinions are journaled, to the respective eccentrics 62 and 66 and from the eccentrics to the members 64 and 68 respectively secured to the driven axles. Normally, no relative motion occurs between the parts of this differential mechanism, but if one of the driven axles is retarded and the other accelerated in speed when the vehicle makes a turn, the eccentrics 62 and 66 are compelled to execute circular bodily motion relative to the housing in opposite directions. Since this motion is in opposite directions, the pins 61 and 65 move in opposed circular paths, and the pinions which are journaled thereon turn within the recesses 55 and 56 to accommodate themselves to the motion of the pins. These pinions, having intermeshing teeth, serve to communicate eccentric motion from one eccentric to the other in opposite directions.

Figure 11:
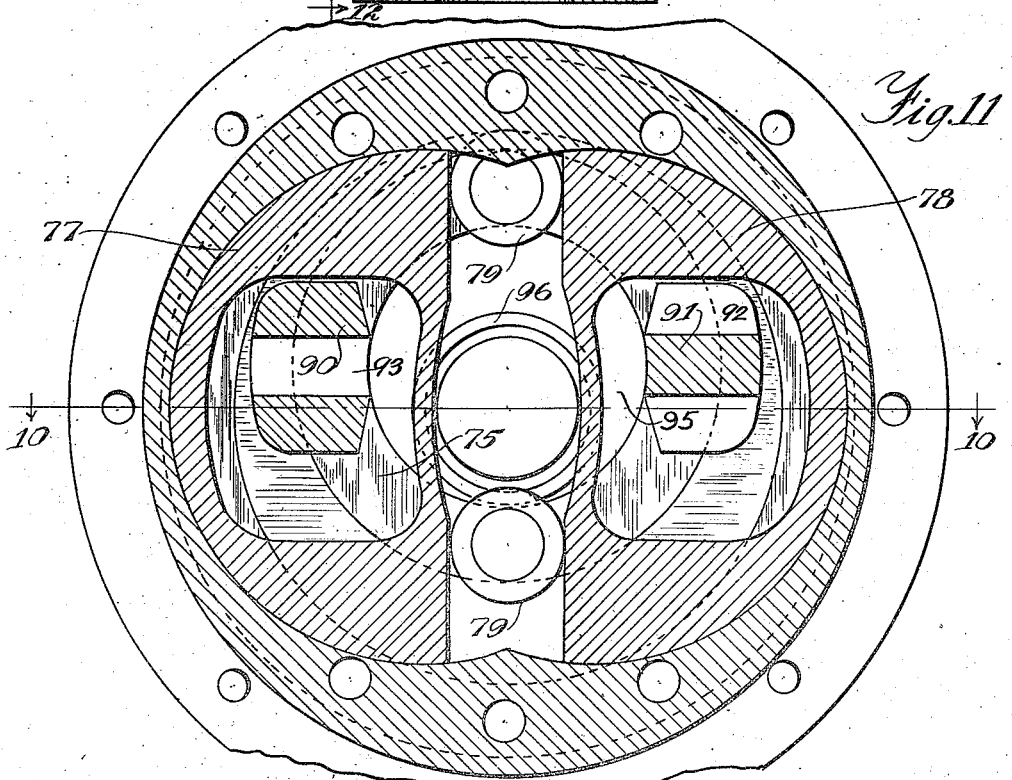
Fig. 11 is a transverse sectional view taken on the line 11—11 of Fig. 10.

Another modification of the invention is shown in Figs. 8 to 13 inclusive. This form, in principle, is similar to the forms previously described, in results obtained, and is likewise distinguishable from most forms of eccentric gears in that the power is transmitted to the gearing through the mechanism which is arranged to permit both rotary and relative circular motion between the driven eccentric members. The casing comprises three parts 70, 71, and 72, which are clamped together by means of bolts 73. One part of the casing is provided with a flange 74 to which a power receiving gear may be secured. The rotary motion from the casing is transmitted to a pair of eccentrics 75 and 76 by means of a pair of semi-circular blocks 77 and 78, and from these blocks through two pairs of rollers 79 and 80. The eccentric members 75 and 76 are journaled within disks 81 and 82 having suitably eccentric cut-out portions to receive the eccentrics 75 and 76. The disks 81 and 82 are respectively keyed to the driven axles 83 and 84. The rollers 79 carried by the eccentric 75 contact with the flat surfaces 85 of the eccentric blocks 77 and 78, while the rollers 80 carried by the eccentric 76 contact with the flat surfaces 86 of the blocks. These semi-circular blocks or plates are arranged to oscillate within the curved surfaces 87 and 88 formed in the part 71 of the casing, the block 77 being cut away at 89 to allow clearance for the rollers 79, and the block 78 being cut away at 90 to allow clearance for the rollers 80, as shown in Fig. 13. The blocks 77 and 78 are also cut away at their central portions to allow clearance for interfitting lugs 90, 91, 92, and 93 formed on the inner surfaces of the eccentrics 75 and 76.

When differential action occurs with this form of the invention, assuming that the shaft 83 is accelerated, and the shaft 84 is retracted, the respective eccentrics 75 and 76 are compelled to make a circular motion for every relative turn of the disks 81 and 82, clearance space 95 being provided between the eccentrics and the hubs 96 of the disks 81 and 82. Considering the non-rotary circular travel of the eccentric 75 and disregarding its rotary motion with the entire unit, the rollers 79 which it carries alternately engage the surfaces 85 and the semi-circular blocks 77 and 78. Likewise, the rollers 80 of the eccentric 76 alternately engage the surfaces 86 of the blocks 77 and 78. The result is that these blocks oscillate in time with the circular motions of the eccentrics from which they receive motion, and serve to compel the eccentrics 75 and 76 to travel in opposite directions. During this reverse motion of the eccentrics, they are guided with respect to each other by their interfitting lugs 90 to 93. These lugs assist in compelling the two eccentrics to rotate together with respect to rotary motion received from the housing, but permitting a relative sliding action in order that the disks 81 and 82 may rotate relatively to each other.

A peculiarity of this invention common to all forms shown in the drawings is that, due to the arrangement of leverage within the gearing, it is exceedingly difficult or practically impossible to effect differential action merely by increasing or decreasing resistance to rotation of one of the wheels. For example, one wheel might be lifted clear of the road, while the other would have good tractive contact therewith. Irrespective of this difference in load, both wheels will rotate at the speed imparted to the differential from the power shaft. Thus, with this mechanism, needless differential action will not take place when one wheel rises clear of the ground, or is in a mud-hole, or slips on the pavement. To effect differential action, one wheel must ordinarily be accelerated and the other retarded with respect to the rate of rotation of the differential mechanism as a unit. This action is precisely what does occur in the practical use of the device. When a vehicle is turning, its center travels in an arc which is midway between the arcs traveled over by the inner and outer wheels. The speed of the differential mechanism as a unit is necessarily midway between the speeds of the inner and outer wheels, the effect being that the inner wheel is retarded, while the outer wheel is accelerated with respect to the power shaft or line of travel of the center of the vehicle. Differential action should take place when the vehicle is running in a straight course in cases where there is a difference in wheel diameters. In such cases, the larger wheel is somewhat retarded over the rate of rotation of the differential unit as a whole, while the smaller wheel is accelerated. Again, the power shaft rotates at a speed which is midway between the speeds of the inner and outer wheels.

When differential action is actually required, it takes place with extreme ease. That is, under those conditions when one wheel is retarded and the other is accelerated, but differential action is exceedingly difficult to obtain by means of the present construction by power applied at one of the wheels only, independently of the power received from the engine shaft.

The lever 24 which serves to transmit reverse motion between the two eccentric members is not in action when both shafts are driven at the same speed and in the same direction, and so far as known, the forms of the present device which utilize said lever differ from other differential mechanisms in the respect that while there is a common driver for the two driven shafts, an independent connection is provided between these shafts having the sole function of transmitting reverse motion from one to the other. There is low mechanical efficiency when the motion is derived from one shaft only, but if the motion is derived from the two shafts while they are being rotated in opposite directions, the mechanism is efficient.

The construction shown differs from most eccentric gear devices in that the mechanism which permits differential action between the two driven members is in itself the driver. Heretofore, eccentric gears have been used mainly as power transmitting and speed changing or reversing means. The advantages in general of such gearing over most mechanical constructions for such purposes are the great amount of leverage possible within a very limited space, its high efficiency, due to the practical absence of friction, since there is little, if any, rubbing contact between the faces of the intermeshing gear teeth, and its great strength and durability, due to the surface area of the contacting portions of the teeth. All these advantages are inherent in the present adaptation of eccentric gearing, but the arrangement is such that easy differential action is only possible under conditions where it is required, and is extremely difficult to obtain when these conditions are not fully met.

Of course, resistance to differential action in the present construction is due mainly to the eccentricity of the eccentric members of the differential. This eccentricity may be varied so as to make differential action comparatively easy, as might be desirable in particular uses of the device. In the arrangement shown in the drawings, the eccentricity is such that under some conditions, the load might be carried by one axle alone. For instance, if one wheel is clear of the road surface, the engine power would not be dissipated by spinning this wheel, but it would be driven merely at the same speed as the wheel which does carry the load. Accordingly, one of the axles might be broken without preventing continued use of the vehicle, since the same could be driven by one wheel. This is believed to be particularly advantageous in connection with army trucks, et cetera, which must at times be driven over rough roads.

It will be understood that numerous details of the construction shown may be altered or omitted without departing from the spirit of this invention as defined by the following claims.

I claim:

1. In a device of the class described, differential mechanism, means for driving said differential mechanism, a pair of driven shafts, and toothed eccentric gearing within said differential mechanism and associated with each shaft to afford a driving connection therefor, said eccentric gearing being also arranged to transmit motion from one shaft to another at a substantially one to one ratio but in opposite direction.

2. In a device of the class described, differential mechanism, means for driving said differential mechanism; and a pair of driven shafts, said differential mechanism comprising two pairs of eccentrically arranged gears for respectively driving said shafts.

3. In a device of the class described, differential mechanism, means for driving said differential mechanism, a pair of driven shafts, said differential mechanism comprising two pairs of eccentrically arranged gears for respectively driving said shafts, and a connection for transmitting motion between said pairs of gears.

4. A differential gearing, comprising a driven member, and a plurality of pairs of eccentrically arranged gears, said driven member having connections to each of said pairs of gears, said member being arranged to transmit rotational motion to the pairs of gears while permitting the members of each pair to have a relative eccentric motion, 5. A differential gearing, comprising a driven member, a plurality of pairs of eccentrically arranged gears, said driven member having connections to each of said pairs of gears, said member being arranged to transmit rotational motion to the pairs of gears while permitting the members of each pair to have a relative eccentric motion, and means for transmitting eccentric motion from one pair of gears to the other in an opposite direction.

6. A differential mechanism, comprising a driven member, and a plurality of pairs of eccentric members, each pair having one eccentric member within the other, said driven member having a driving connection to one eccentric member of each pair.

7. A differential mechanism, comprising a driven member, a plurality of pairs of eccentric members, each pair having one eccentric member within the other, said driven member having a driving connection to one eccentric member of each pair, and means for transmitting motion from one pair of eccentric members to another pair of eccentric members in an opposite direction.

8. A differential mechanism, comprising a pair of driven eccentrics, means for rotating said eccentrics on their axes in the same direction, said means being arranged to permit said eccentrics to move in opposite circular paths, and a pair of concentric driven members having eccentric journals for supporting said eccentrics.

9. An eccentric gearing, comprising a pair of driven eccentric gears, said gears being arranged to revolve around a common axis and to independently rotate on their own axes, and means for transmitting motion in opposite directions from one of said gears to the other, said means being also arranged to drive both of said gears in the same direction.

10. An eccentric differential gearing, comprising two driven members, eccentric gearing associated with each member, and means connecting said gearing arranged to transmit motion from one driven member to the other at a substantially one to one ratio but in opposite direction.

11. Differential mechanism, comprising a pair of driven concentric members, a pair of gyratory members for driving said driven members, means for imparting motion to said gyratory members in a common direction, and a lever connecting said gyratory members whereby independent motion may be reversely communicated from one to the other.

12. A differential mechanism, comprising a pair of driven shafts, a pair of eccentrically supported members each of which is arranged in driving relation with one of said shafts, means for driving both of said members in the same direction, and a connection between said members for communicating an independent motion from one to the other in a reverse direction only.

13. A differential mechanism, comprising two driven members, a driver, separate gears connected between said driver and each of said driven members, means movably mounted on each of said gears for controlling its action, and a connection between said movably mounted means to prevent relative motion of said gears except in opposite directions.

14. In a device of the class described, differential mechanism, means for driving said differential mechanism, a pair of driven shafts, said differential mechanism comprising two pairs of eccentrically arranged gears for respectively driving the said shafts, and a connection between one gear of each pair adapted to secure said one gears against rotation on their own axes, but permit said one gears to revolve in opposite directions about the axis of said driving shafts.

Signed at Chicago this 12th day of Nov., 1917.

JOHN KROHN.